United States Patent
Cahill et al.

(10) Patent No.: US 12,211,516 B2
(45) Date of Patent: Jan. 28, 2025

(54) NOISE EVENT DETECTION AND CHARACTERIZATION

(71) Applicant: Eaton Intelligent Power Limited, Dublin (IE)

(72) Inventors: Niall Cahill, Dublin (IE); Johannes Van De Belt, Ballsbridge (IE); Keith Nolan, Mullingar (IE)

(73) Assignee: EATON INTELLIGENT POWER LIMITED, Dublin (IE)

( * ) Notice: Subject to any disclaimer, the term of this patent is extended or adjusted under 35 U.S.C. 154(b) by 232 days.

(21) Appl. No.: 17/906,011

(22) PCT Filed: Mar. 10, 2020

(86) PCT No.: PCT/EP2020/056364
§ 371 (c)(1),
(2) Date: Sep. 9, 2022

(87) PCT Pub. No.: WO2021/180311
PCT Pub. Date: Sep. 16, 2021

(65) Prior Publication Data
US 2023/0101366 A1 Mar. 30, 2023

(51) Int. Cl.
*G10L 25/51* (2013.01)
*H04R 1/40* (2006.01)

(52) U.S. Cl.
CPC ............. *G10L 25/51* (2013.01); *H04R 1/406* (2013.01)

(58) Field of Classification Search
CPC ................................. G10L 25/51; H04R 1/406
USPC ............................................... 381/56, 57, 58
See application file for complete search history.

(56) References Cited

U.S. PATENT DOCUMENTS

| 2012/0099739 | A1 | 4/2012 | Hultz et al. |
| 2013/0073263 | A1 | 3/2013 | Sieracki |
| 2014/0105262 | A1* | 4/2014 | Alloin ................ H04L 27/2688 375/222 |
| 2015/0135837 | A1 | 5/2015 | Dougherty et al. |
| 2018/0140233 | A1* | 5/2018 | Lacirignola .......... A61B 5/6814 |

\* cited by examiner

*Primary Examiner* — Thjuan K Addy
(74) *Attorney, Agent, or Firm* — LEYDIG, VOIT & MAYER, LTD.

(57) ABSTRACT

A method characterizes a noise event, and includes locating microphones in an environment and generating a training event at a location in the environment as a reference for a noise event. A sound sample is recorded at each microphone and phase differences between the sound samples are used to establish a noise event signature for an event at that location. A noise event may subsequently be identified by taking sound samples from the microphones associated with the noise event and using phase differences between them to identify the noise event by matching against noise event signatures.

20 Claims, 5 Drawing Sheets

NOISE EVENT DETECTION AND CHARACTERIZATION

FIELD OF DISCLOSURE

The present disclosure relates to noise event detection and characterization. It is particularly relevant to complex environments where noises of different origin may arise, and for which it is desirable to identify which of various noise event types may have occurred.

BACKGROUND TO DISCLOSURE

Control processes respond to input variables which frequently comprise sensed values. In complex environments, there will often be a plurality of sensors to detect events, with control processes being responsive to these events. As shown in FIG. 1, such a complex environment may for example be a geographical location 1 or a group of associated buildings, where a wide variety of different sensors 3 may be used to determine behaviour within the environment, for use for example in control systems for predictive power management to anticipate and respond to future demand. A control system 5 is shown remotely to the location 1, the control system using data from the sensors 3 to determine behaviour of a power supply system 4 supplying power to power consumers 2 in the location 1.

Although a rich set of sensors can provide unique signatures for real-world events—, such as appliances turning on, correct pump operation, etc.—even in complex environments, it can be very challenging to distinguish between multiple events of the same type, or between similar real-world events. This is particularly challenging when noise is the most straightforward evidence of an event to obtain. Microphones are relatively cheap sensors, and they provide a rich data output—it can however be difficult to distinguish similar events by their noise profile, or to distinguish events of a similar type occurring in different locations. It would be desirable to do this more effectively.

SUMMARY OF DISCLOSURE

In a first aspect, the disclosure provides a method of characterising a noise event, comprising: locating a plurality of microphones in an environment; generating a training event at a location in the environment as a reference for a noise event; recording a sound sample at each of the plurality of microphones; determining phase differences between the sound samples of different microphones from the plurality of microphones; and establishing a noise event signature for an event at the location from the determined phase differences between sounds associated with the training event at different microphones of the plurality of microphones.

Using this approach, the difference in location between microphones can be exploited by using multipath effects—closely located microphones will see different destructive and constructive effects by combination of multipath signals, leading to different signals at each microphone, with the possibility of establishing a noise event signature by using the differences between the two microphones.

Acoustic signatures have been used in certain specific situations to recognise a particular type of event—for example, Can et al "Recognition of vessel acoustic signatures using non-linear Teager energy based features" in 2016 International Workshop on Computational Intelligence for Multimedia Understanding (IWCIM) describes use of underwater acoustic signal recognition to recognise different classes of vessel; and Kandpal et al "Classification of ground vehicles using acoustic signal processing and neural network classifier" uses time domain feature extraction and a neural network classifier to recognise different vehicle types. However, these are not directed to using multiple sensors in such a way that the existence of multiple acoustic paths can be used to distinguish events of the same type from each other.

The event may simply be an event of one particular type at a particular location. Alternatively, the event may be an event of a predetermined type at a particular location, and noise event signatures may be recorded for a plurality of noise event types at a plurality of locations. Training events may be used in this way to characterise a range of noise event types known to occur in a particular environment.

The method may further comprise determining whether the phase differences between the sound samples meet a quality threshold for establishing the noise event signature, generating a further training event at the location if the phase differences do not meet the quality threshold and establishing the noise event signature from the initial training event (s) and the further training event. This may be further repeated, if needed, and in this way it can be ensured that noise event signatures are of sufficient quality.

Determining phase differences may comprise first transforming the sound samples into the frequency domain, for example by Fast Fourier Transform (FFT). Any appropriate type of sliding window may be used to perform the FFT. Using such an approach, determining phase differences may comprise establishing a feature vector comprising phase differences between a pair of microphones in said plurality of microphones across a plurality of frequency bins. This may be extended to a feature matrix resolvable into a plurality of said feature vectors each involving phase differences between different pairs of microphones of said plurality of microphones.

In a second aspect, the disclosure provides method of identifying a noise event, characterised in that noise events have been characterised by phase differences between sounds associated with the noise event type at different microphones of a plurality of microphones located in an environment, the method comprising: identifying a sound sample at different microphones of the plurality of microphones as being associated with the noise event; determining phase differences between the sound samples at the different microphones of the plurality of microphones to establish a signature for the noise event; and matching the signature of the noise event against previously characterised signatures for noise event types to identify the noise event.

The previously characterised signatures indicate a noise event location, a noise event type, or both.

Determining phase differences may comprise first transforming the sound samples into the frequency domain, for example by Fast Fourier Transform (FFT). Any appropriate type of sliding window may be used to perform the FFT. At least some of the previously characterised signatures may comprise a feature vector comprising phase differences between a pair of microphones in said plurality of microphones across a plurality of frequency bins, or may comprise a feature matrix resolvable into a plurality of said feature vectors each involving phase differences between different pairs of microphones of said plurality of microphones. Matching may then comprise determining the microphones of the plurality for which the noise event has been identified, determining parts of a previously characterised signature that relate to the microphones of the plurality for which the noise event has been identified, and only using those parts of the previously characterised signature in matching.

In a third aspect, the disclosure provides a computing system adapted to identify noise events in an environment, wherein the computing system is configured to receive sound samples from each of a plurality of microphones located in the environment, wherein the computing system is adapted to establish a plurality of noise event signatures from determined phase differences between sounds associated with the noise event at different microphones of the plurality of microphones, and is further adapted to determine signals corresponding to a noise event from the plurality of microphones and to identify the noise event by matching the signals from the plurality of microphones against the plurality of noise event signatures.

Such a computing system may be adapted to establish the plurality of noise event signatures using the first aspect described above, and may be adapted to identify the noise event using the second aspect described above.

In a fourth aspect, the disclosure provides a power management system, comprising a control system receiving event data from a plurality of local computing systems and one or more local computing systems being computing systems according to the third aspect described above and adapted to report identified noise events to the control system.

DESCRIPTION OF SPECIFIC EMBODIMENTS

Specific embodiments of the disclosure are now described, by way of example, with reference to the accompanying drawings, of which:

In embodiments of the disclosure, a plurality of microphones is used first to characterise different event types, and then to identify real-world events as being one of these event types. Individual microphones may be located relatively close to each other, with minor differences between signals used to characterise the different event types. In establishing these differences, the contributions made by different paths that sound is taken between the event origin and any individual origin can be very significant—these are thus multipath signatures. This contrasts to most processing of sound, in which it is normal to go to some length to suppress contributions from indirect paths. Here, multipath information can be very useful, as for example the presence or absence of a particular path type can be very significant in indicating the event origin and so the source of the event.

Figure 2:
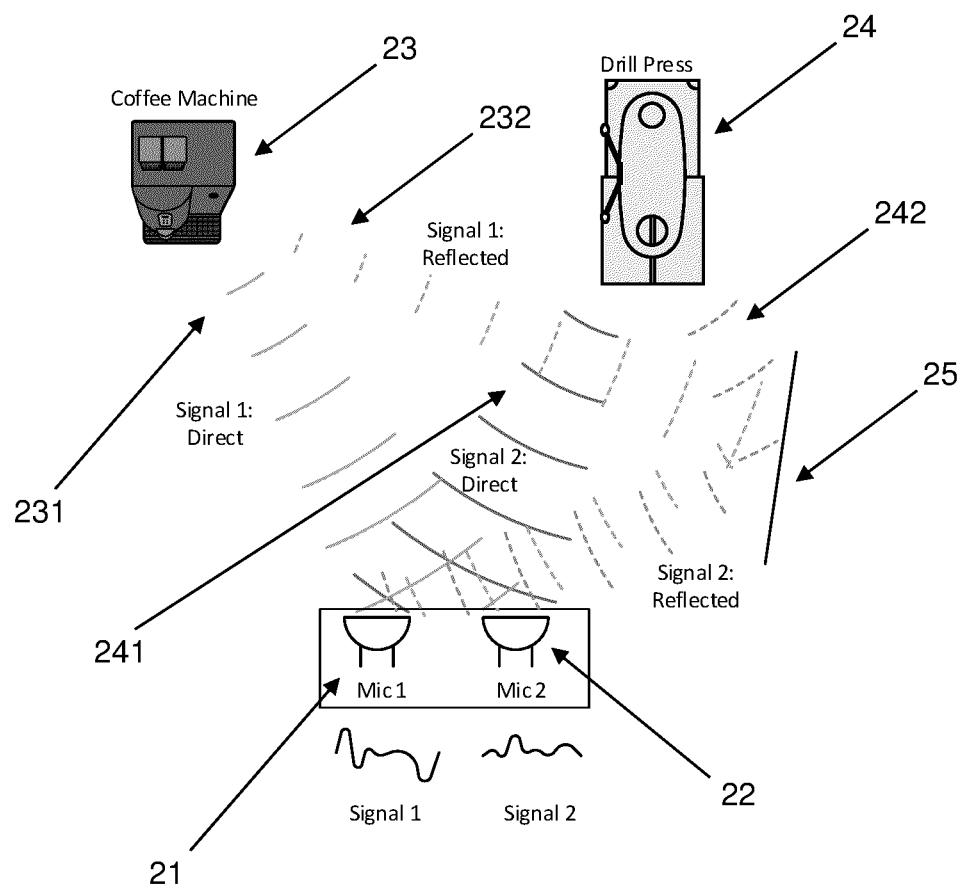
FIG. 2 shows an exemplary use of multiple microphones to characterize real-world events of different types.

Two microphones located a relatively small distance apart can provide significantly different signals. An exemplary arrangement is shown in FIG. 2—two microphones 21 and 22 are placed in reasonably close proximity to each other—close enough to avoid spatial aliasing, and so that phase information will be relevant (audible sound has wavelengths between approximately 0.015 m and 15 m). These microphones record sound independently and capture the noise spectrum with a high bandwidth (say from 20 Hz to 20 kHz). This provides signals in the time domain, which can be converted to the frequency domain by Fourier transform (typically using FFT), with the phase difference then being calculated for each frequency bin. This provides a vector of phase differences if two microphones are used—a matrix if more microphones are used—which will be highly specific not only to the noise source type but also to the location of the noise location because of multipath effects. Multipath signals will lead to constructive and destructive interference determined by room layout, shape and size. This is shown in FIG. 2, where noise sources coffee machine 23 and drill press 24 each provide a direct signal 231, 241 and an indirect signal 232, 242 resulting from reflection off surface 25. The interference pattern between the direct signals 231, 241 and the indirect signals 232, 242 will be different at the first microphone 21 from that at the second microphone 22 as the path difference is different at each microphone, so the recorded signals will be different at each microphone for, say, a coffee machine 23 event.

Figure 3:
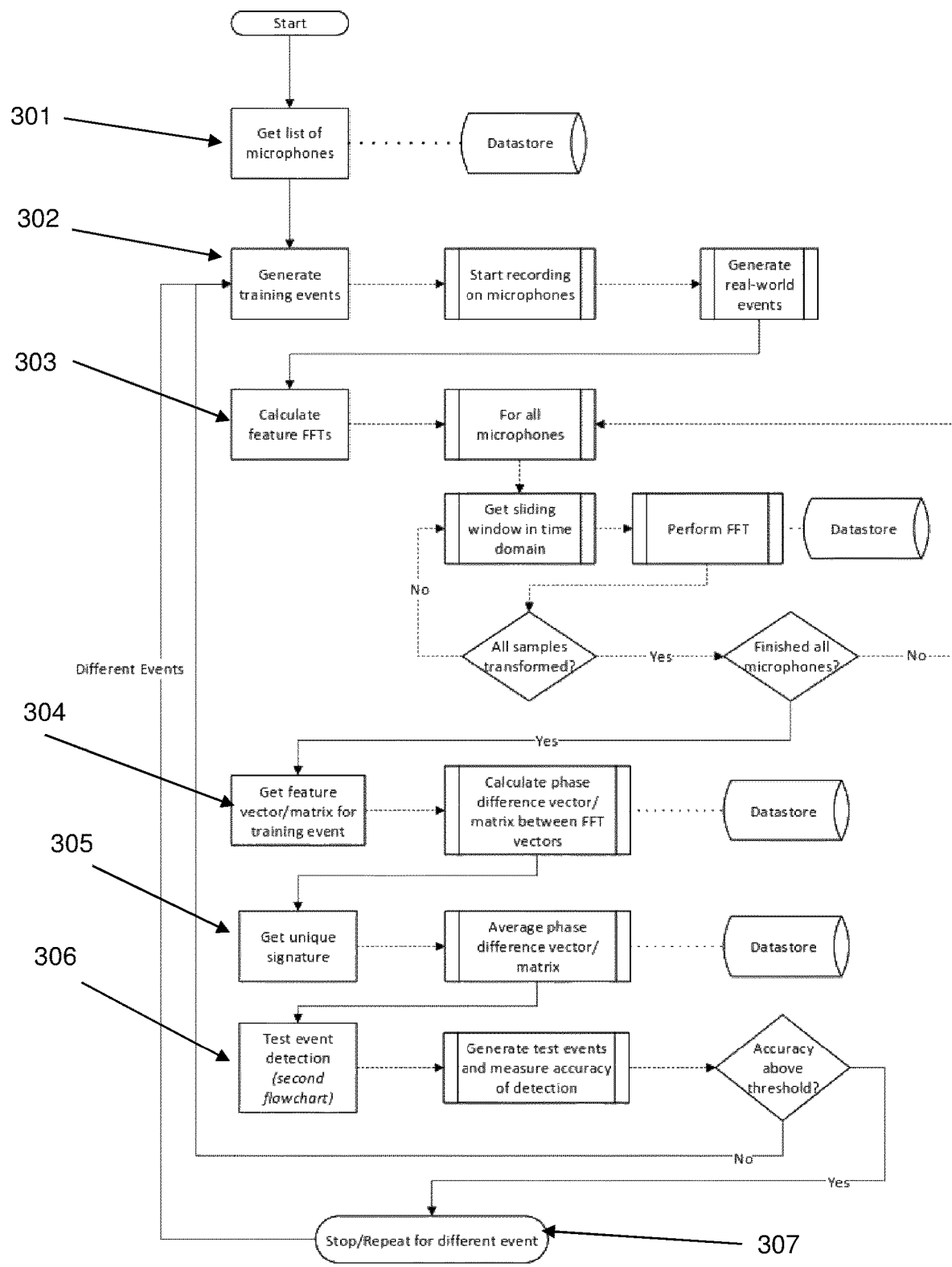
FIG. 3 shows a method for classifying events using noise phase difference according to an embodiment of the disclosure.
Figure 5:
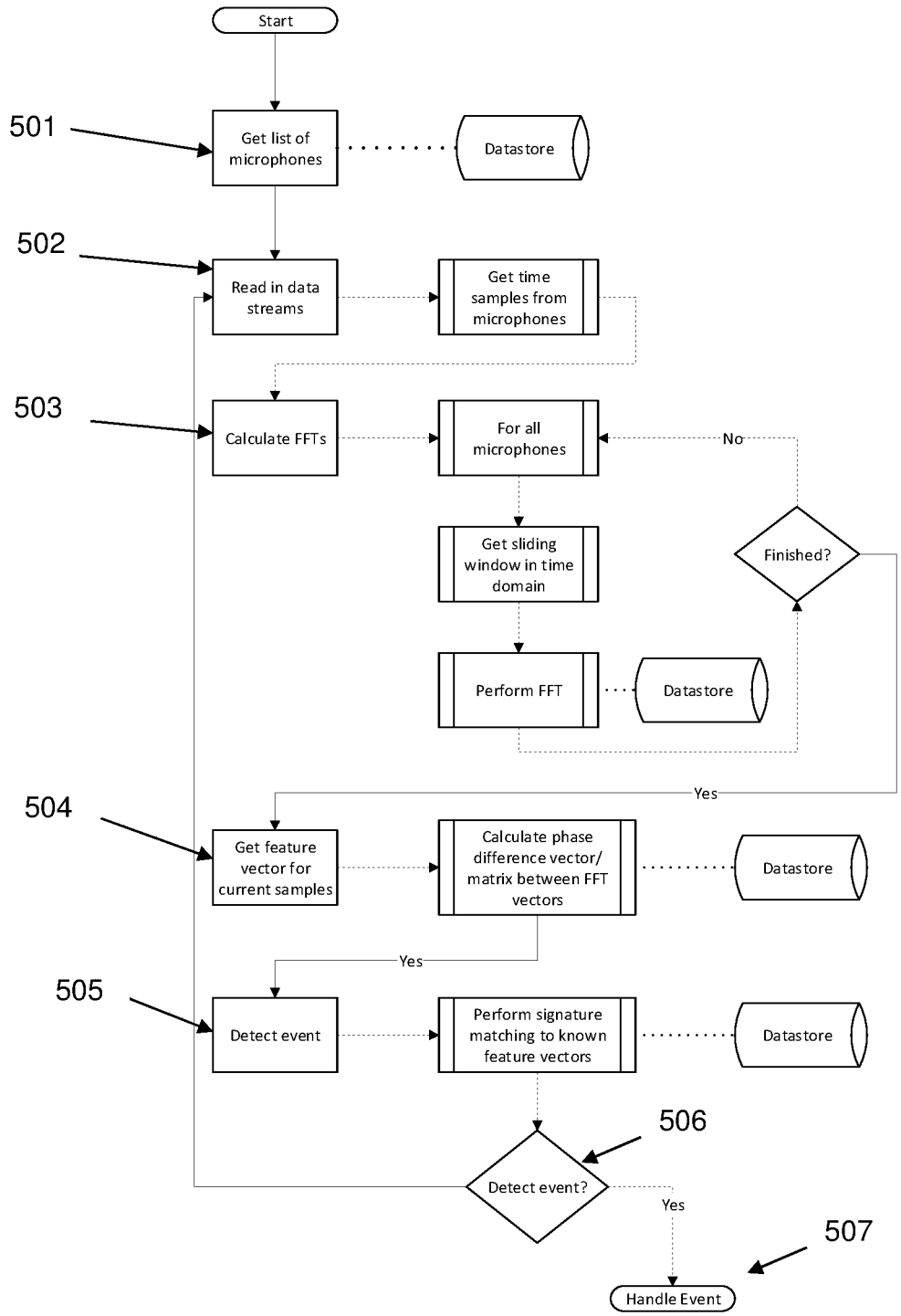
FIG. 5 shows a method for detecting events using noise phase difference signatures according to an embodiment of the disclosure.

Implementation of this approach involves two processes—characterisation of the different noise types as event signatures, shown in FIG. 3, and detection and characterisation of a noise event using its event signature, shown in FIG. 5.

The steps for characterizing the event signatures, shown visually in FIG. 3, are as follows:

Discover 301 how many microphones are available. This can be achieved via reading a datastore record, or through an active process of discovery over one or more networks using conventional sensor connection protocols. Appropriate protocols include the following: Inter-Integrated Circuit (I2C), Serial Peripheral Interval (SPI), Internet Protocols IPv4 and IPv6, Modbus, serial interface RS232, and OPC UA.

Generate 302 a training event for a real-world event which you want to characterize, and record this on all microphones. This may simply be a performance of the relevant real-world event in a situation where there are no other noise events making a significant contribution to the signal at any of the relevant microphones.

Convert 303 the time-domain samples to the frequency domain for each microphone using a fast Fourier transform FFT. This can be done by applying a sliding window with a configurable overlap e.g. by including N samples from the previous range of selected samples. The FFT would be carried out multiple times for each microphone, depending on the size of the window. Any appropriate window function may be used (Hamming, Hann, Blackman-Harris etc.). This process is repeated for all the data samples for all the microphones.

Figure 4:
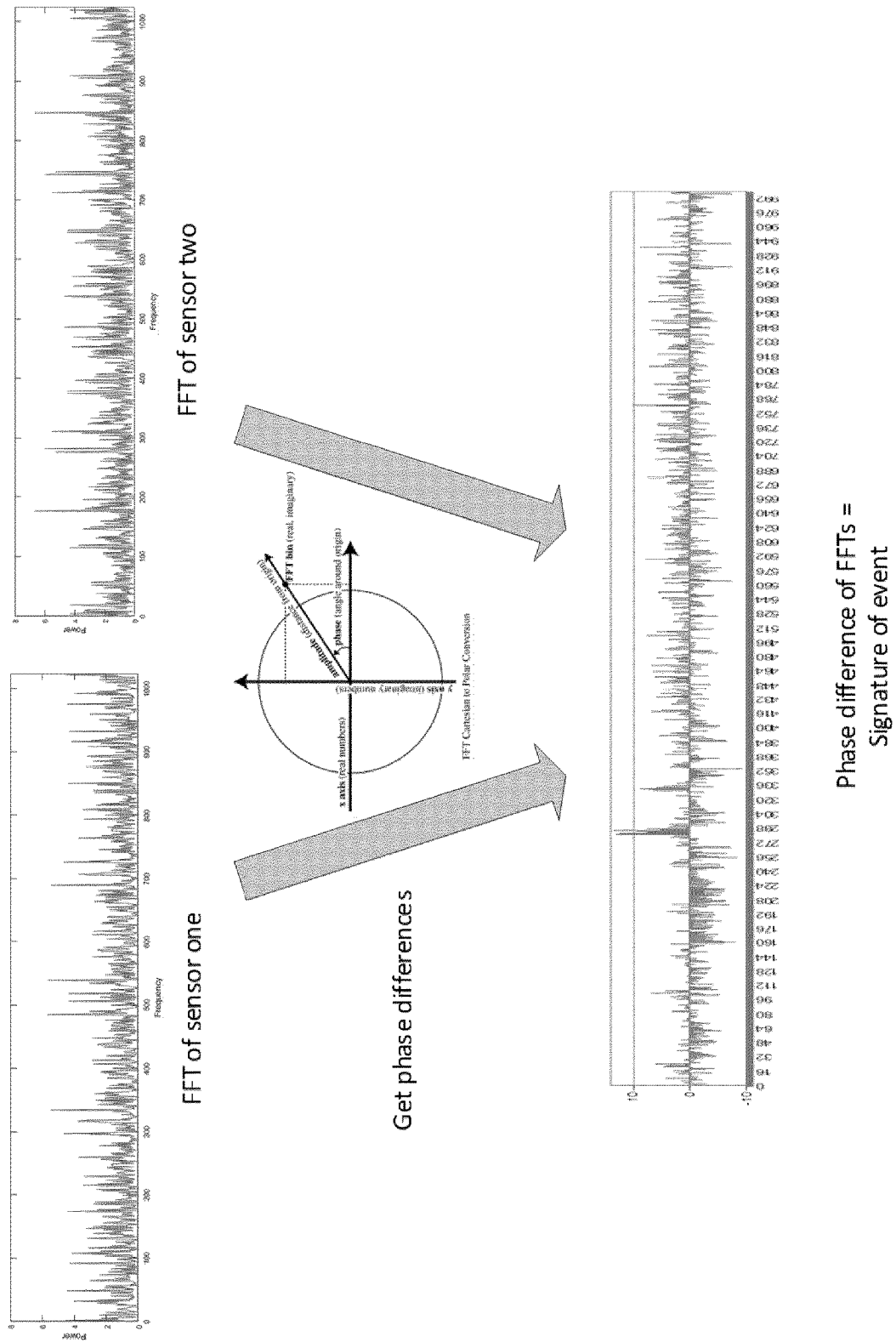
FIG. 4 illustrates the comparison of FFTs from different microphones to illustrate phase differences between them.

When the samples for each microphone are in the frequency domain, the next step is to generate 304 a feature vector or matrix for each training event. Where there are two microphones, a feature vector is generated based on the phase difference between different frequency vectors. An exemplary feature vector is shown in FIG. 4 comprising a distinctive pattern of differences between FFTs. Where there are more than two microphones, there will be a feature matrix which can be resolved into a plurality of feature vectors representing phase differences between specific microphones.

At this point, it is possible to provide 305 a unique characteristic feature vector or matrix for this particular noise event, which is stored as a candidate event signature.

It is now necessary to determine whether this candidate event signature is of sufficient quality to be used as the event signature for the noise event.

The candidate event signature is now tested 306 by performing multiple further events—these are test events rather than training events, and are used to test whether the candidate event signature recognises them. If the accuracy of recognition exceeds a threshold in respect of false positive and negative recognition, the candidate event signature is accepted as the event signature. If the accuracy of recognition does not meet this threshold, a further training event is required 302, with the training steps repeated and the candidate event signature updated by combining it with the data obtained from the new training event. The updated candidate event signature is then evaluated as before, and the process succeeds until the candidate event signature passes the threshold and can be recognised as the actual event signature for the noise event.

The resulting event signature is a unique characteristic feature vector or matrix for that particular event of sufficient quality that there is reasonable confidence that the event will be recognised in the future.

To continue the calibration process, these steps need to be repeated 307 for another noise event type until all noise event types to be detected have had a characteristic feature vector or matrix established.

The steps for detection the event signatures, shown visually in FIG. 5, are similar but slightly different:

Discover 301 how many microphones are available—this may be the same processes as for generating the signature. Note that the set of microphones may not be exactly the same as for the signature.

Read 302 data streams from each of the available microphones.

Calculate 303 FFTs for each microphone, using a sliding window exactly as for generating the signature. The same processes should of course be used for establishing the signal from the event to be detected as for the signatures, as the intention is to match the detected event against the signatures.

Get 304 the feature vector or matrix of the current samples as phase differences between the multiple frequency domain vectors as before.

The next step is different, and it involves matching 305 of the feature vector or matrix for the potential event against known event signatures. The following considerations need to be addressed here:

matching may take place against, potentially, all recorded signatures—though it is also possible that signatures may be tagged with the microphones needed to create them, and that there may then not be matching with a signature where there is a clear inconsistency between microphones detecting a potential event and microphones used in generating the signature for that event;

like-by-like must be matched in order to determine whether the potential event matches a known event signature;

to do this, the matching needs to be across microphone pairs used for both determination of the signature and measurement of the potential event; and data that is not matchable should not be used in the matching process (for example, data relating to a microphone used in one of signature generation and potential event detection, but not both)—this may mean, for example, that not every row or column of a feature matrix may be used in matching.

The process of matching between two data sets is well understood by the person skilled in the art and is not discussed further here, save to note that there will be a threshold established for sufficient proximity between the feature vectors/matrix of a signature and an event to determine whether there is accepted to be a match.

If an event is detected 506, then this is followed by an event handling process 507 appropriate to that event. This may be used in monitoring (for example, to establish a pattern of use associated with a particular profile for power use), or it may be used to initiate a control action.

The process then simply continues until another potential event is detected.

Figure 1:
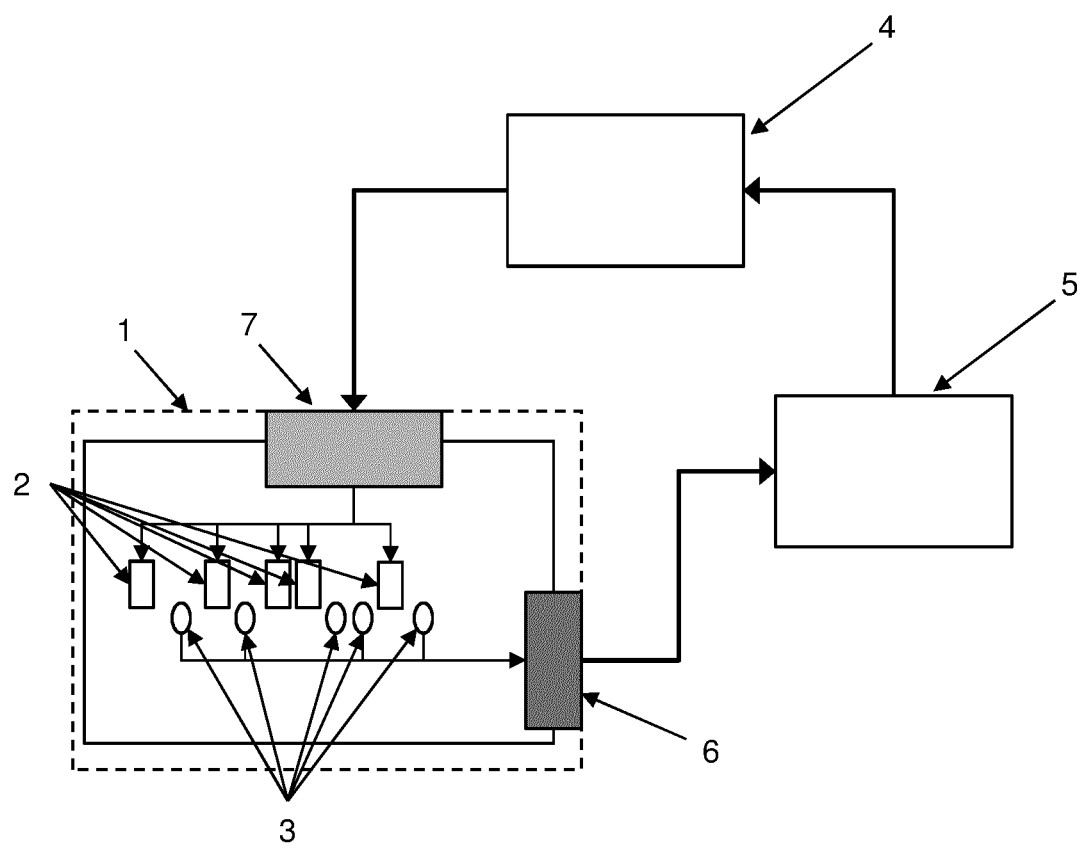
FIG. 1 shows a control system determining actions on the basis of detected events using a plurality of sensors.

In an arrangement such as that shown in FIG. 1, the steps of these processes—both signature creation and event detection—may take place at the control system 5, but may advantageously take place at an intermediate point within the geographical location (environment) 1 itself, such as edge computing system 6. This may take both roles so that only detected and classified events are transmitted from the edge computing system to the control system 5 (which may receive inputs from a number of geographical locations).

The control system 5 may then use the classified events to analyse activity in the geographical location 1 and elsewhere, and this analysis may be used for management of the power supply system 4 which is here shown as supplying power to the environment 1 through local power distribution system 7. In some arrangements, local power distribution system 7 may be in direct communication with, or otherwise associated with, edge computing system 6, though this is not shown directly in FIG. 1.

Classification of events in this way enables more sophisticated analysis and so also enables more sophisticated control strategies. For example, an increased power demand in the environment may result from a number of causes, but detection of event types may be able to distinguish, say, activation of heating systems (likely to indicated demand over an extended period in that environment) from activation of cleaning equipment across the environment (indicating presence of a cleaning crew with a much more limited effect). This knowledge may be used as part of a control strategy in allocating resources.

As the skilled person will appreciate, the embodiments described above are exemplary, and further embodiments falling within the spirit and scope of the disclosure may be developed by the skilled person working from the principles and examples set out above.

The invention claimed is:

1. A method of characterising a noise event, comprising:
locating a plurality of microphones in an environment;
generating a training event at a location in the environment as a reference for a noise event;
recording a sound sample at each of the plurality of microphones;
determining phase differences between the sound samples of different microphones from the plurality of microphones; and,
establishing a reference noise event signature for the noise event at the location from the determined phase differences between sounds associated with the training event at different microphones of the plurality of microphones.

2. The method of claim 1, wherein the event is an event of a predetermined type.

3. The method of claim 1, further comprising determining whether the phase differences between the sound samples meet a quality threshold for establishing the noise event signature, and generating a further training event at the location if the phase differences do not meet the quality threshold, and establishing the noise event signature from the training event and the further training event.

4. The method of claim 3, wherein determining whether the phase differences between the sound samples meet a quality threshold comprises determining whether they meet a predetermined threshold for recognition of test events as corresponding to the noise event.

5. The method of claim 1, wherein determining phase differences comprises first transforming the sound samples into the frequency domain.

6. The method of claim 5, wherein a Fast Fourier Transform is used to transform sound samples into the frequency domain.

7. The method of claim 5, wherein determining phase differences comprises establishing a feature vector comprising phase differences between a pair of microphones in said plurality of microphones across a plurality of frequency bins.

8. The method of claim 7, wherein determining phase differences comprises a feature matrix resolvable into a plurality of said feature vectors each involving phase differences between different pairs of microphones of said plurality of microphones.

9. A method of identifying a noise event, wherein noise events have been characterised by reference noise event signatures from phase differences between determined sounds associated with the noise event type at different microphones of a plurality of microphones located in an environment, the method comprising:
  identifying a sound sample at different microphones of the plurality of microphones as being associated with the noise event;
  determining phase differences between the sound samples at the different microphones of the plurality of microphones to establish a signature for the noise event; and,
  matching the signature of the noise event against the previously characterised reference noise event signatures for noise event types to identify the noise event.

10. The method of claim 9, wherein the previously characterised signatures indicate a noise event location.

11. The method of claim 8, wherein the previously characterised reference noise event signatures indicate a noise event type.

12. The method of claim 9, wherein determining phase differences comprises first transforming the sound samples into the frequency domain.

13. The method of claim 12, wherein a Fast Fourier Transform is used to transform sound samples into the frequency domain.

14. The method of claim 9, wherein at least some of the previously characterised signatures comprise a feature vector comprising phase differences between a pair of microphones in said plurality of microphones across a plurality of frequency bins.

15. The method of claim 14, wherein at least some of the previously characterised signatures comprise a feature matrix resolvable into a plurality of said feature vectors each involving phase differences between different pairs of microphones of said plurality of microphones.

16. The method of claim 14, wherein matching comprises determining the microphones of the plurality for which the noise event has been identified, determining parts of a previously characterised reference noise event signature that relate to the microphones of the plurality for which the noise event has been identified, and only using those parts of the previously characterised reference noise event signature in matching.

17. A computing system adapted to identify noise events in an environment, wherein the computing system is configured to receive sound samples from each of a plurality of microphones located in the environment, wherein the computing system is adapted to establish a plurality of reference noise event signatures from determined phase differences between sounds associated with the noise event at different microphones of the plurality of microphones, and is further adapted to determine signals corresponding to a noise event from the plurality of microphones and to identify the noise event by matching the signals from the plurality of microphones against the plurality of reference noise event signatures.

18. The computing system of claim 17, wherein the computing system is adapted to establish the plurality of reference noise event signatures by a method comprising the steps of:
  locating a plurality of microphones in an environment;
  generating a training event at a location in the environment as a reference for a noise event;
  recording a sound sample at each of the plurality of microphones;
  determining phase differences between the sound samples of different microphones from the plurality of microphones; and,
  establishing a reference noise event signature for the noise event at the location from the determined phase differences between sounds associated with the training event at different microphones of the plurality of microphones.

19. The computing system of claim 17, wherein the computing system is adapted to identify the detected noise event by a method wherein noise events have been characterised by phase differences between sound samples associated with the noise event type at different microphones of a plurality of microphones located in an environment, the method comprising:
  identifying a sound sample at different microphones of the plurality of microphones as being associated with the noise event;
  determining phase differences between the sound samples at the different microphones of the plurality of microphones to establish a signature for the noise event; and,
  matching the signature of the noise event against previously characterised reference noise event signatures for noise event types to identify the noise event.

20. A power management system, comprising a control system receiving event data from a plurality of local computing systems and one or more local computing systems being computing systems as claimed in claim 16 and adapted to report identified noise events to the control system.

* * * * *